March 16, 1943.   H. R. CRAGO   2,314,197
AUTOMATIC CONDITION RESPONSIVE CONTROL
Filed Oct. 8, 1941
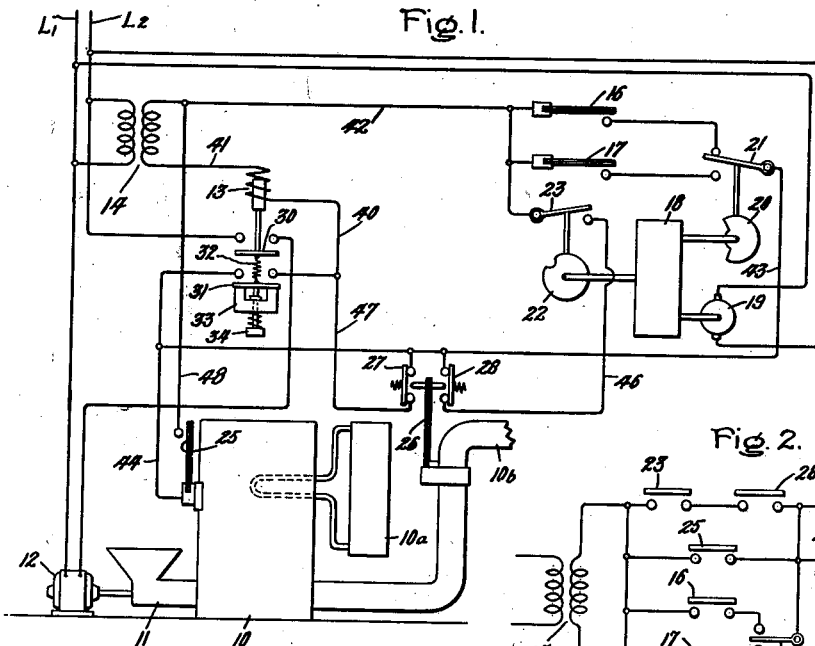
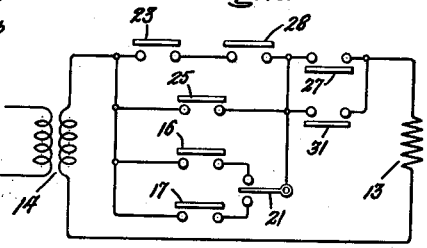
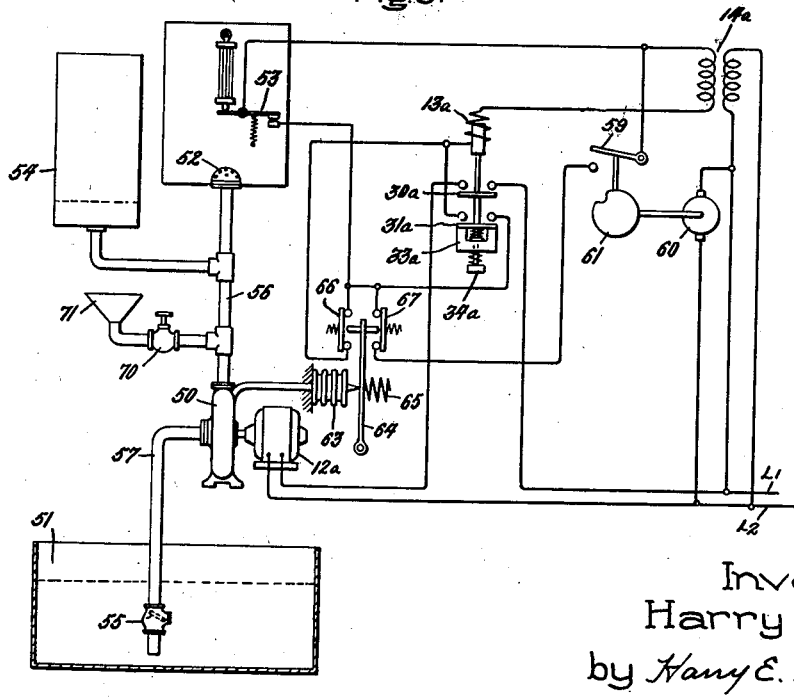
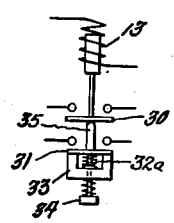
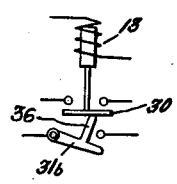
Inventor:
Harry R. Crago,
by Harry E. Dunham
His Attorney.

Patented Mar. 16, 1943

2,314,197

UNITED STATES PATENT OFFICE 2,314,197

AUTOMATIC CONDITION RESPONSIVE CONTROL

Harry R. Crago, Schenectady, N. Y., assignor to General Electric Company, a corporation of New York Application October 8, 1941, Serial No. 414,157

7 Claims. (Cl. 236—9)

The invention relates to automatic condition responsive control and provides an improved automatic selective control system and improved apparatus that are specially adapted for controlling both anthracite and bituminous stokers, particularly of the house heating type, although some of the improvements may be used with advantage in other automatic condition responsive control service.

The principal objects are to combine improved automatic control devices into an improved automatic selective control system capable of regulating operation of a stoker under both normal and abnormal conditions so as to provide automatic day and night room thermostatic control automatic temperature control for domestic hot water heating, automatic timed hold-fire control to keep the stoker fire alive in mild weather, automatic selective skip-cycle and out-fire control to prevent either a timed hold-fire run occurring whenever the stoker fire is in good condition or all automatic operation of the stoker whenever the fire becomes extinguished, and a special manual restart control operating automatically to insure resumption of all automatic stoker control operations after the stoker fire is rekindled.

More specific objects are to combine the automatic day and night room thermostat control with the automatically timed hold-fire control in a single improved timing control device, to combine the skip-cycle control and the out-fire control in a single improved thermostatic double circuit selective control device responsive to conditions of the stoker fire so as selectively to render all of the other automatic temperature responsive and timed hold-fire stoker control means ineffective when the rate of combustion falls below a predetermined range but only the automatic timing hold-fire control means ineffective when the rate of combustion exceeds said range, and to combine the manual restart control in a single improved stoker motor control relay so as automatically to shift from the manual restart control to full automatic control upon resumption of normal stoker operations.

Other objects will be pointed out in the following description of the accompanying drawing in which Fig. 1 schematically illustrates a stoker control system embodying the improvements of the present invention in a preferred form; Fig. 2 is a simplified diagram of the control circuit connections of the system shown in Fig. 1; and Figs. 3 and 4 show modified forms of the manual restart control mechanism; and Fig. 5 schematically shows certain improvements of the present invention employed in an automatic humidifying control system and apparatus.

In the stoker control system of Fig. 1, the boiler furnace 10 is shown as of the conventional steam type although the improvements of the present invention may be used with either hot water, hot air, or other types of furnaces with equal advantage. The stoker mechanism 11 may be of any conventional form driven by the stoker operating motor 12 to supply coal and air to the furnace combustion chamber so as to produce and regulate the combustion therein. The energization of the stoker operating motor 12 is under the control of a special electromagnetic relay 13. This relay is energized from the low voltage secondary of the transformer 14 having its primary continuously energized from the supply lines L1, L2.

The energization of the relay 13 is controlled in accordance with the house heating demand by means of the day room thermostat 16 and the night room thermostat 17 which are alternately rendered operative at the desired time by means of the continuously operating automatic time switching mechanism 18 having a driving motor 19, preferably of the synchronous type connected to be continuously energized from the supply lines L1, L2 which may be assumed to be the ordinary alternating current house service lines. The continuously operating motor 19 operates through suitable gearing the cam 20 which in turn operates the day-night changeover switch 21. The timing motor 19 also operates through suitable gearing the timing cam 22 so as to periodically open and close the automatic timed hold-fire switch 23.

The energization of relay 13 also is controlled by an aquastat 25 which may be mounted so as to be responsive to the temperature of the water in the boiler furnace 10 used to heat the domestic water tank 10a as illustrated in the drawing or may be applied directly to the domestic water heating tank 10a if desired.

The automatic skip-cycle and out-fire selective control is provided by the improved single thermostat 26 which, as shown in the drawing, is adapted to be clamped to the flue 10b of the boiler furnace 10 so as thereby to be made responsive to the condition of the fire in the furnace. The thermostat 26 operates selectively to open the out-fire control switch 27 when the flue gas temperature falls below a predetermined low value indicating that the furnace fire has become or is likely to become extinguished. The thermostat 26 operates selectively the skip-cycle switch 28 when the flue gas temperature exceeds a predetermined higher value indicating that the stoker has recently been operating and the fire is therefore in such good condition as not to require operation of the automatically timed hold-fire control to keep it alive.

The electromagnetic relay 13 controls the energizing circuit of the stoker motor 12 by opening and closing the main stoker switch 30. As shown in Fig. 1, the improved restart switch 31 is connected with the main stoker switch 30 by means of the tension spring 32 so that when the main stoker switch 30 is in its closed position the restart switch 31 will likewise be held by spring 32 in its closed position provided switch 31 has been manually released from the permanent magnet 33 by means of the manual release button 34. Otherwise, restart contact 31 will always be held in the open position by magnet 33 in case the manual release button 34 is not operated.

*Operation*

To start the stoker 11 into operation, a fire is kindled in the furnace 10 in any desired manner. Then the manual release button 34 is operated to close the restart switch 31. This establishes an energizing circuit for the operating winding of relay 13 extending from the restart switch 31, conductor 40, the operating winding of relay 13, conductor 41, secondary winding of transformer 14, conductor 42, either the day or the night thermostat 16 or 17 in its circuit closing position, depending upon when the furnace is started, and the conductors 43 and 44. As a result of energization of the relay, the main stoker switch 30 is operated to its closed position thereby energizing the stoker motor 12 to start operation of the stoker coal and air feed mechanism 11.

Since the relay 13 is energized immediately upon operation of the manual release button 34 to close restart switch 31, the spring 32 immediately becomes effective to maintain the restart switch 31 in its circuit closing position as long as the relay 13 remains energized. Thus relay 13 can become deenergized under the manual restart conditions just described only after the continued operation of the stoker mechanism 11 produces sufficient heat in the furnace 10 to cause both the aquastat 25 and either the day or the night room thermostat to open its contacts. Then the main stoker switch 30 will be opened and the restart switch 31 will be returned to its initial position in which it is held by the magnet 33.

As the fire in the furnace 10 is brought into good condition by operation of the stoker 11 in the manner just described, the stack thermostat 26 will respond selectively to close the out-fire switch 27 when the rate of combustion rises within a predetermined minimum range and when the rate of combustion exceeds this minimum range to open the skip-cycle switch 28. This latter will prevent energization of the relay 13 due to the timed closure of the timed hold-fire switch 23 by the timing motor 19. However, in case both the room thermostat and the aquastat should remain satisfied for an extended interval and thus not energize the relay 13 and produce further operation of the stoker 11 so as to keep the fire in the furnace 10 in good condition, the stack thermostat 26 will then respond to the decrease in temperature of the flue gases so as to reclose the skip-cycle switch 28. Thereafter, at the timed intervals determined by the shape and speed of operation of cam 22, the hold-fire switch 23 will be closed for relatively short intervals and opened for relatively long intervals. This timed closure of the hold-fire switch 23 serves to energize the relay 13 through a circuit extending from the secondary of the transformer 14 through conductor 42, the hold-fire switch 23 in its closed position, conductor 46, the skip-cycle switch 28 in its closed position, the out-fire switch 27 in its closed position, and conductors 47 and 40, operating winding of relay 13 and conductor 41. The energization of stoker motor 12 will be continued only during the period in which the hold-fire switch 23 remains closed. In case the timed operation of the stoker 11 should result in increasing the firing activity to the point where the stack thermostat 26 responds to open the skip-cycle switch 28, indicating that the fire again is in good condition, then further timed operation of the stoker will be stopped.

If the timed periodic hold-fire operation of stoker 11 is not sufficient to maintain the water in the boiler furnace 10 at the temperature necessary to provide an adequate supply of domestic hot water, then the aquastat switch 25 will close its contacts. This will result in the energization of the relay 13, the circuit extending from the secondary of the transformer 14 through conductor 48, the aquastat 25 in its closed position, conductor 44, the out-fire switch 27 in its closed position, conductors 47 and 40, the operating winding of relay 13 and conductor 41. If the resulting operation of the stoker 11 serves to increase the firing activity sufficiently to cause the stack thermostat 26 to open the skip-cycle switch 28, then this will prevent a hold-fire run for some time after the stoker has been operated by the aquastat.

In case for some unexplained reason the fire in the furnace 10 should become extinguished, then the stack thermostat switch 26 will respond to the decreased temperature of the flue gases so as to open the out-fire switch 27. This prevents energization of relay 13 by either the room thermostats or the aquastat and also the hold-fire switch and thereby prevents all automatic operation of the stoker 11 when there is no fire in the furnace. Under these conditions, it becomes necessary to restart the stoker operation manually in the manner previously described.

As more clearly shown in the simplified circuit diagram of Fig. 2, the hold-fire switch 23, the skip-cycle switch 28 and the out-fire switch 27 are all connected in series in the energizing circuit of the relay 13 which includes the secondary of the transformer 14. The water temperature switch 25 is connected in shunt with both the hold-fire switch 23 and the skip-cycle switch 28. Furthermore, the restart switch 31 is connected in shunt with the out-fire switch 28 so that when the latter is open due to extinguishment of the stoker fire, closure of the restart switch 31 will serve to establish a shunt energizing circuit around the out-fire switch 27.

In the modified form of restart switch mechanism shown in Fig. 3, the switch 31 is held in the open position by the permanent magnet 33 against the force of the compression spring 32a until released by manual operation of the push button 34. The closure of switch 31 serves to energize the operating winding of the relay 13 in the same way as previously described, thus closing the main switch 30 for energizing the stoker motor. This leaves the restart switch 31 held in the closed position by the spring 32a. Upon deenergization of relay 13 in the manner previously described, the resulting opening of switch 30 operates through the agency of the push pin 35 to open the restart switch 31 against the bias of spring 32a and return switch 31 into holding relation with the magnet 33.

In the modified form of restart switch mechanism illustrated in Fig. 4, the restart switch 31b is of the simple type that may be manually closed and remain held by friction in the closed position. The closure of the restart switch 31b serves to effect energization of the operating winding of relay 13 in the manner previously described. In this case, upon deenergization of relay 13, the main stoker motor switch 30 is opened and engages with the push pin 36 to move the restart switch 31b to the open position.

The improvements of the present invention are not necessarily limited to a stoker control system but, as shown in Fig. 5, may be used with advantage in other automatic condition responsive control systems. In the humidifier control system of Fig. 5, the centrifugal pump 50 is driven by the motor 12a to supply water from a suitable source 51 to the humidifying spray nozzle 52. The operation of motor 12a is controlled by the relay 13a which is energized from the secondary of the transformer 14a under the control of the humidity responsive switch 53.

In order to maintain the centrifugal pump 50 primed, a priming water reservoir 54 is connected to the pump discharge pipe 56 and the check valve 55 is located adjacent the end of the pump intake pipe 57. Furthermore, in order to take care of the unavoidable leakage through the check valve 55, the prime holding switch 59 is arranged to be periodically opened and closed by the continuously operating timing motor 60 through the agency of the timing cam 61. The periodic prime holding switch 59 is connected to energize the operating winding of the relay 13a independently of the humidity responsive switch 53.

In order to prevent energization of the relay 13a in case the priming of pump 50 should be lost, the bellows 63 is connected to be responsive to the pressure of the water in the casing of the pump 50 and is arranged to operate the arm 64 against the bias of spring 65. Thus when the water pressure in the casing of pump 50 decreases to a relatively low value, indicating that the priming is or is about to be lost, the pivoted arm 64 opens the normally closed lost priming switch 66. However, when ample priming water pressure is present in the casing of pump 50, the pivoted arm 64 moves away from the lost priming switch 66 and opens the skip-priming switch 67 which is shown as connected in series with the periodic priming switch 59. The lost priming switch 66 is connected so as to interrupt the circuits through which the humidity responsive switch 53 and the periodic priming switch 59 energize the relay 13a. Thus, under normal conditions, the operating winding of relay 13a will be energized under the control of the humidity responsive switch 53 to effect operation of the motor 12a to drive the pump 50 and supply humidifying water to the spray nozzle 52 whenever the humidity responsive device 53 closes its contacts. This will cause priming water to be forced into the priming reservoir 54. In case, however, the operation of the pump 50 under the control of the humidity responsive device 53 is so infrequent that the leakage through check valve 55 permits the level of the water in the priming reservoir 54 to decrease, then the skip-priming switch 67 will be closed. Under these conditions, the periodic opening and closing of the periodic priming switch 59 will serve to operate the pump 50 at sufficiently frequent intervals to maintain a proper level of the water in the priming reservoir 54. However, if for some reason the priming water level should fall so low that the lost priming switch 66 is opened, then further automatic operation of the system is prevented.

Under such conditions of lost priming, the valve 70 may be opened and water introduced in any suitable way through the priming funnel 71 to fill the casing of pump 50 and pipe 57. Then the valve 70 is closed and the push button 34a is operated to move the restart switch 31a away from the magnet 33a to the circuit closing position, thereby closing a shunt circuit around the lost priming switch 66. This enables the relay 13a to be energized in case the humidity responsive device 53 is in the circuit closing position. As a result, the motor 12a will be energized to operate the pump 50 and refill the priming water reservoir 54. The operation of the pump 50 will continue until relay 13a is deenergized by the opening of the humidity responsive switch 53. Thereupon, the main motor switch 30a will be opened and the restart switch 31a will be returned to its initial normally open position in which it is held by the electromagnet 33a.

What I claim as new and desire to secure by Letters Patent of the United States, is:

1. In combination, a stoker having a driving motor, a main switch for controlling the energization of said motor, electroresponsive means for closing said main switch, an energizing circuit for said means, a hold-fire switch in said circuit, periodic operating means for opening and closing said hold-fire switch, a skip-cycle switch in said circuit, operating means responsive to the condition of the stoker fire for opening said skip-cycle switch when the fire is relatively high, an out-fire switch in said circuit, means responsive to the condition of the stoker fire for opening said out-fire switch when the fire is relatively low, an automatic control switch connected in shunt circuit with both said hold-fire switch and said skip-cycle switch, operating means responsive to variations in a condition dependent upon operation of said stoker for opening and closing said control switch, a restart switch connected in shunt circuit with said out-fire switch, manually operable means for closing said restart switch, and automatic means dependent upon deenergization of said electroresponsive means for opening said restart switch.

2. In combination, a stoker, an electrically operated relay for starting and stopping operation of said stoker, means for energizing said relay including a hold-fire switch, a skip-cycle switch, and an out-fire switch, all connected in series, timing means for periodically closing said hold-fire switch, automatic means responsive to variations in the condition of the stoker fire for opening said skip-cycle switch when the fire is in a predetermined normal condition and for opening said out-fire switch when the fire goes out, a thermostatic switch connected in shunt circuit with both said hold-fire switch and said skip-cycle switch and responsive to a condition dependent upon operation of said stoker, a manually operable restart switch connected in shunt circuit with said out-fire switch, and automatic means dependent upon deenergization of said relay for opening said restart switch.

3. In combination, a burner having a relay for controlling the operation thereof, an energizing circuit for said relay including a pair of series connected switches, automatic means responsive to the condition of the burner fire for opening one of said switches when the fire goes out, automatic means responsive to a condition dependent upon operation of the burner for opening and closing the other of said switches, a restart switch connected in shunt with said one switch and manually operable to a closed position for energizing said relay when the burner fire is out, and means rendered effective upon deenergization of said relay for automatically returning said restart switch to the open position.

4. In combination, a burner having a control relay, an energizing circuit for said relay including a pair of series connected switches, automatic means responsive to the condition of the burner fire for opening one of said switches when the fire goes out, automatic means responsive to a condition dependent upon operation of the burner for opening and closing the other of said switches, a restart switch connected in shunt with said one switch and manually operable to a closed position for energizing said relay when the burner fire is out, and means rendered effective upon deenergization of said relay for automatically returning said restart switch to the open position.

5. In combination, a burner having a control relay, an energizing circuit for said relay, a plurality of automatic burner control switches connected in series in said circuit, a normally open switch connected in shunt with one of said control switches, manually operable means for closing said normally open switch to energize said relay when said one control switch is open, and means rendered effective upon subsequent deenergization of said relay for automatically returning said normally open switch to the open position.

6. In combination, condition changing means having a control relay, an energizing circuit for said relay, a plurality of automatic condition responsive control switches connected in series in said circuit, a normally open switch connected in shunt with one of said control switches, manually operable means for closing said normally open switch to energize said relay when said one control switch is open, and means rendered effective upon subsequent deenergization of said relay by another of said control switches for automatically returning said normally open switch to the open position.

7. In combination, condition changing means having a control relay, a plurality of automatic means for deenergizing said relay, means including a member manually operable from one position to another position for rendering one of said automatic deenergizing means ineffective, and means dependent upon subsequent deenergization of said relay by another of said automatic means for returning said manually operable member to said one position.

HARRY R. CRAGO.